(12) United States Patent
Kwakernaak et al.

(10) Patent No.: US 8,532,447 B1
(45) Date of Patent: Sep. 10, 2013

(54) MULTI-MODE INTERFERENCE SPLITTER/COMBINER WITH ADJUSTABLE SPLITTING RATIO

(75) Inventors: Martin H. Kwakernaak, Los Angeles, CA (US); Hiroshi Wada, Tokyo (JP)

(73) Assignee: Emcore Corporation, Albuquerque, NM (US)

( * ) Notice: Subject to any disclaimer, the term of this patent is extended or adjusted under 35 U.S.C. 154(b) by 207 days.

(21) Appl. No.: 13/089,999

(22) Filed: Apr. 19, 2011

(51) Int. Cl.
*G02B 6/26* (2006.01)

(52) U.S. Cl.
USPC .......................................................... 385/31

(58) Field of Classification Search
USPC ........................................................ 385/9, 31
See application file for complete search history.

(56) References Cited

U.S. PATENT DOCUMENTS

| | | | | |
|---|---|---|---|---|
| 5,236,784 A * | 8/1993 | Kobayashi et al. | ............ | 428/408 |
| 5,297,233 A | 3/1994 | Lerminiaux | | |
| 5,524,076 A | 6/1996 | Rolland et al. | | |
| 5,689,597 A * | 11/1997 | Besse | ............... | 385/39 |
| 5,774,486 A | 6/1998 | Jiang et al. | | |
| 5,862,288 A * | 1/1999 | Tayag et al. | .................... | 385/129 |
| 6,324,312 B1 | 11/2001 | Liao et al. | | |
| 6,421,482 B1 * | 7/2002 | Augustsson | ................... | 385/129 |
| 6,571,038 B1 | 5/2003 | Joyner et al. | | |
| 6,643,432 B2 * | 11/2003 | Bouda | ............................. | 385/43 |
| 6,792,172 B1 * | 9/2004 | Levy et al. | ....................... | 385/15 |
| 7,058,259 B2 * | 6/2006 | Stuart | .............................. | 385/28 |
| 7,181,109 B2 | 2/2007 | Kwakernaak | | |
| 7,280,713 B2 * | 10/2007 | Doi et al. | ........................... | 385/8 |
| 7,546,001 B2 | 6/2009 | Welch et al. | | |
| 7,734,122 B1 * | 6/2010 | Mackie | ............................ | 385/14 |
| 7,773,840 B2 | 8/2010 | Kwakernaak et al. | | |
| 2001/0036336 A1 | 11/2001 | Vrieze | | |
| 2001/0053262 A1 * | 12/2001 | Kinoshita et al. | ............... | 385/24 |
| 2002/0154849 A1 * | 10/2002 | Leuthold | ......................... | 385/15 |
| 2003/0174961 A1 * | 9/2003 | Hamada | .......................... | 385/48 |
| 2004/0130810 A1 | 7/2004 | Valette | | |
| 2005/0213912 A1 * | 9/2005 | Aalto | ............................. | 385/129 |
| 2005/0244103 A1 * | 11/2005 | Kwakernaak | ................... | 385/39 |
| 2009/0304332 A1 | 12/2009 | Schweiker | | |
| 2010/0119229 A1 * | 5/2010 | Roelkens et al. | ............... | 398/79 |

FOREIGN PATENT DOCUMENTS

TW          434426 B    5/2001
WO    WO2010050975 A1   5/2010

* cited by examiner

*Primary Examiner* — Charlie Peng

(57) ABSTRACT

A multimode interference splitter/combiner that includes a monolithic device for photonically coupling an input optical waveguide to first and second output optical waveguides. The input waveguide may be optically coupled to a first end of a MMI portion, while the first and second output waveguides may be optically coupled to a second end of the MMI portion. The input waveguide is coupled to a planar facet of the MMI portion so that the input waveguide may have a propagation axis that is oriented at an angle with respect to the planar facet of the MMI portion. A desired splitting ratio may be achieved by adjusting the angle between the input waveguide and the MMI portion.

19 Claims, 7 Drawing Sheets

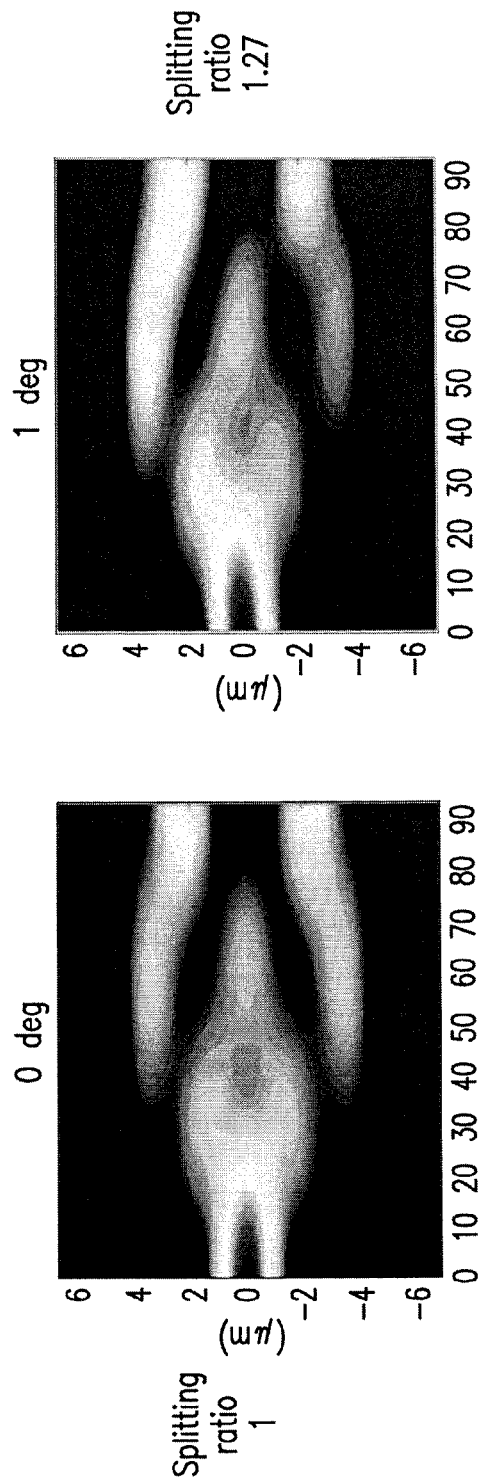
FIG. 3A  FIG. 3B
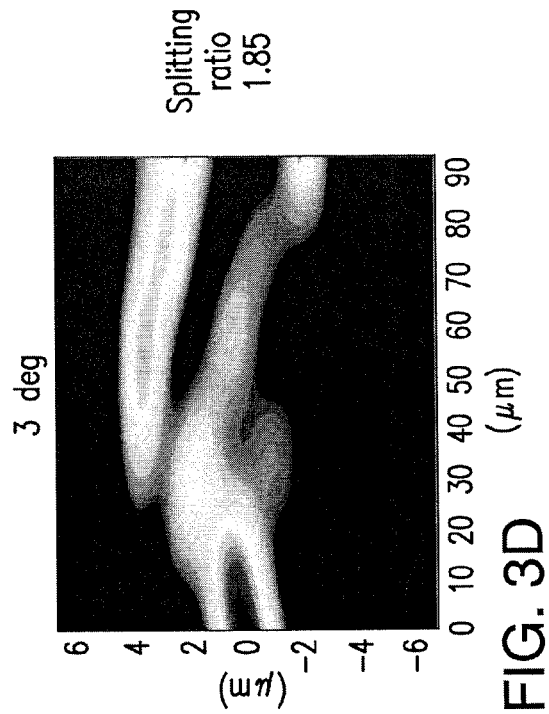
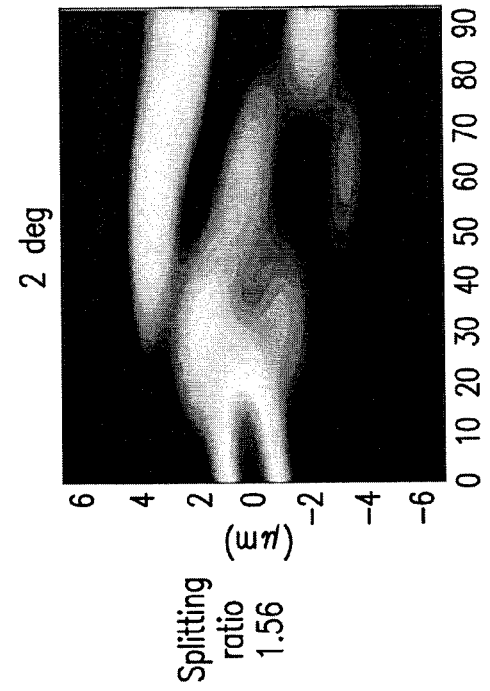
FIG. 3C  FIG. 3D

MULTI-MODE INTERFERENCE SPLITTER/COMBINER WITH ADJUSTABLE SPLITTING RATIO

FIELD OF THE DISCLOSURE

The disclosure relates generally to the field of optical devices, and more particularly to a multimode interference (MMI) device for performing optical beam splitting and/or combining.

BACKGROUND OF THE DISCLOSURE

Multimode interference (MMI) devices, such as MMI couplers, are important integrated optical components for optical signal processing and routing. MMI devices typically utilize direct coupling in which the input waveguide is in contact with one or more output waveguides. This is in contrast to indirect coupling which relies upon evanescent field coupling through waveguides which are in close proximity to each other.

MMI devices may be used for beam splitting, combining and coupling and contain one or more input waveguides and one more output waveguides. Input and output waveguides are connected to a central multimode waveguide region. An MMI device of particular interest consists of one input waveguide and two or more output waveguides. The physical characteristics of the coupling and multimode waveguide regions are selected such that modal dispersion within the central multimode waveguide region provides for a single beam of light input into the first coupling waveguide to be split into the two or more second coupling waveguides. Operated in reverse, the device may function as a beam combiner.

MMI devices are subject to various losses associated with back reflections and other considerations due to mode mismatch and device manufacturing limitations. The splitting ratio of MMI devices, which is the ratio of power emerging from the output ports, is difficult to tune due to the design fabrication intolerances. Thus, there is a need to improve losses associated with MMI devices while obtaining desired splitting ratios.

SUMMARY OF THE INVENTION

The present application includes multimode interference couplers. The couplers may include a first waveguide defined by a first portion having a first propagation axis. The coupler may include a multimode interference (MMI) portion positioned at an acute angle to said first propagation axis and having a first end optically coupled to the first waveguide. The MMI portion may split the first optical signal into second and third optical signals each having a different power level according to a power ratio functionally associated with a magnitude of the acute angle. Second and third waveguides may be optically coupled to a second end of the MMI portion and may be arranged to receive the second and third optical signals.

The present application also includes Mach-Zehnder modulators. The modulators may include a first multimode interference (MMI) device having a first end optically coupled to an input waveguide. The first MMI device may be configured to receive a first optical signal and split the first optical signal into a second and third optical signals each having a respective power level and supplying said second optical signal to a first output waveguide and supplying said third optical signal to a second output waveguide. The MMI device may have a propagation axis at an acute angle to a propagation axis of said input waveguide. A first modulator arm may be coupled to the first output waveguide to receive the second optical signal. A second modulator arm may be coupled to the second output waveguide to receive the third optical signal. First and second electrodes may be coupled to the corresponding first and second modulator arms, each of the electrodes may be configured to change a refractive index in the modulator arms in response to an applied electric field. A second MMI device may have a first input coupled to said first modulator arm and a second input coupled to said second modulator arm. The second MMI device may be configured to combine the second and third optical signals destructively or constructively based on a refractive index change in at least one of the modulator arms and output a modulated optical signal to an output waveguide of the second MMI device.

The application also includes methods of splitting an input beam into two separate output beams. The methods may include receiving an input optical signal along a first propagation axis of an input waveguide, sending the input optical signal through the input waveguide along a second propagation axis, the first and second propagation axes forming a first angle; sending the input optical signal along the second propagation axes to an optical splitter; and splitting the input optical signal into at least a first output optical signal and a second output optical signal, with each of said output optical signals having a different power level in accordance with a power ratio defined by the second angle.

The application also includes methods of modulating an optical beam. The methods may include receiving a first optical signal at a first multimode interference (MMI) device, moving the first optical signal within the first MMI device from a first propagation axis to a second propagation axis, the first propagation axis positioned at an acute angle relative to the second propagation axis, splitting the first optical signal in the first MMI device into second and third optical signals with the second optical signal having a different power level than the third optical signal based on the acute angle, moving the second optical signal from the first MMI device to a first output waveguide and moving the third optical signal from the first MMI device to a second output waveguide, applying an electrical field to interferometer arms along the first and second output waveguides and modulating a phase of at least one of the second and third optical signals, moving the modulated second and third optical signals into a second MMI device and combining the signals destructively or constructively based on the electric field into a modulated fourth optical signal, and outputting the modulated fourth optical signal from the second MMI device.

The present invention is not limited to the above features and advantages. Some implementations or embodiments may incorporate or implement fewer of the aspects or features noted in the foregoing summaries. Those skilled in the art will recognize additional features and advantages upon reading the following detailed description, and upon viewing the accompanying drawings.

BRIEF DESCRIPTION OF THE DRAWINGS

FIGS. 3A-3D are representations of fields within the MMI region of the splitter/combiner incorporating various input waveguide input angles.

DETAILED DESCRIPTION

Integrated optical devices capable of equal 1×N splitting of optical power may include a single mode input waveguide, a multimode section and N single mode output waveguides, where N represents any positive integer. In one embodiment, N may be a multiple of two and for equal splitting the input waveguide is typically centrally located on the input face of the multimode region and the output waveguides are typically evenly spaced along the output face. By selecting the width and length of the multimode section, the light emanating from the input waveguide is "self-imaged" to form N images at the entrances to the output waveguides.

Various embodiments are directed to a multimode interference (MMI) coupler having an input waveguide, a MMI portion optically coupled at a first end to the input waveguide, and first and second output waveguides optically coupled to a second end of the MMI portion.

Other embodiments include a method for splitting an optical signal. The method may comprise introducing an optical signal to an optical splitter, the optical splitter having an edge or entry facet, the optical signal introduced at an acute angle with respect to the edge or entry facet. The method may split, at the optical splitter, the optical signal into first and second split optical signals, and output the first and second split optical signals via first and second output waveguides. The optical power of the first split optical signal may be different from the optical power of the second split optical signal, where the difference between the two powers is dependent upon a selected magnitude of the acute angle.

Further embodiments include a system for multimode interference splitting/combining. The system may include an optical signal source, an input waveguide optically coupled to the optical signal source, a MMI portion optically coupled at a first end to the input waveguide, and first and second output waveguides optically coupled to a second end of said MMI portion. The input waveguide may have a propagation axis that is angled with respect to a propagation axis of the MMI portion, while the output waveguides may have a propagation axis that is parallel to the propagation axis of the MMI portion.

In some embodiments, the MMI coupler can be used for splitting and directing light in integrated devices, such as Mach-Zehnder interferometers, optical waveguide filters, and ring-resonators, among others. In addition, large scale integrated photonic circuits may incorporate such MMI couplers, which are well suited to split and couple light in a controllable and predictable fashion.

Figure 1:
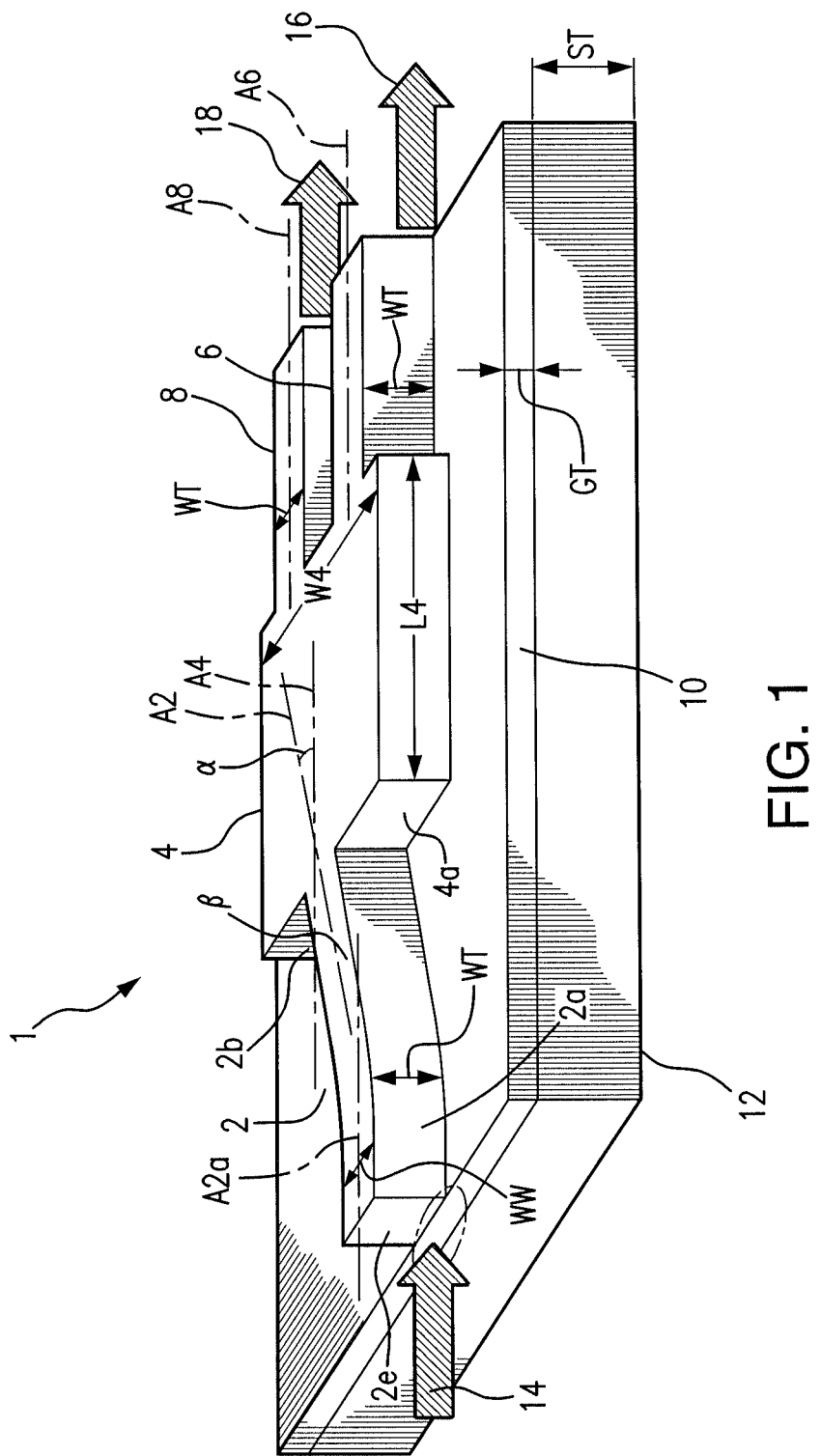
FIG. 1 is an isometric view of an exemplary MMI coupler in accordance with the disclosure.

Referring to FIG. 1, a MMI device 1 may generally comprise, among other elements, an input waveguide 2, a MMI portion 4, and first and second output waveguides 6, 8. The MMI device 1 is disposed on a guiding layer 10, which itself is disposed on a substrate 12. It will be appreciated that although some embodiments describe the MMI portion 4 as a "splitter" performing optical splitting operations, that the MMI portion 4 can also function as a "combiner" performing optical combining operations when an optical signal is introduced in a reverse direction through the MMI device 1 (e.g., signal is applied via the output waveguides 6, 8).

The input waveguide 2 has a propagation axis A2 which forms an angle alpha ($\alpha$) with respect to a propagation axis A4 of the MMI portion 4. The output waveguides 6, 8 have propagation axes A6, A8 that are substantially parallel to the longitudinal axis A4 of the MMI portion 4. When the light enters the MMI portion 4, it propagates in several modes resulting in various intensity patterns as shown with reference to FIGS. 3a-3d as described in more detail below. In one embodiment, the angle alpha ($\alpha$) may be in a range from about −3 degrees to about +3 degrees, although the embodiments are not limited in this context. Thus arranged, the input waveguide 2 is bent, angled or otherwise tilted with respect to the MMI portion 4 and the output waveguides 6, 8. This tilt advantageously results in different output signal power being applied to the output waveguides. By careful selection of the tilt angle, a highly granular power splitting ratio between the output waveguides can be achieved.

In the illustrated embodiment, the input waveguide 2 has first and second portions 2a, 2b. The first portion 2a may receive an input optical signal from an optical supply network or source (not shown). The second portion 2b may be connected to a first end 4a of the MMI portion 4. The first portion 2a of the input waveguide 2 may have a propagation axis A2a that is substantially parallel to the longitudinal axis A4 of the MMI portion 4. As can be seen, the second portion 2b is tilted forming angle alpha ($\alpha$) between a portion of input waveguide 2 just before the MMI and the MMI portion 4. In some embodiments, the propagation axis A2 of second portion 2b may be curved, or bent, so that the propagation axis A2 is tilted at an angle beta ($\beta$) with respect to propagation axis A2a of first portion 2a of input waveguide 2. In other words, first portion 2a of input waveguide 2 provides a relatively straight input port to MMI device 1 in order to receive an input optical signal from a supply which may be, for example, another waveguide, fiber or other optical medium. Second portion 2b of input waveguide 2 provides an angled coupling or output port to the MMI portion 4 in order to achieve a desired splitting ratio for the output waveguides 8, 6. In this manner, the propagation axis of the external optical supply can be aligned with the propagation axis A2a of first portion 2a allowing for easy alignment of MMI device 1 with the external optical supply medium, while at the same time allowing varying splitting ratios for the MMI portion 4. The propagation axis A2 of second portion 2b with respect to propagation axis A2a of first portion 2a of input waveguide 2 remains the same as described above.

The material and dimensions of the various portions of the MMI device 1 may vary depending on manufacturing tolerances and fabrication considerations. For example, substrate 12 may be InP having a thickness ST in the range of 50 microns to 500 microns with a preferable thickness of about 115 microns. The guiding layer 10 may be formed from InGaAsP, AlInGaAs, and/or InP having a thickness GT in the range of about 0.1 to 1.5 microns. The cladding layer of the waveguides can be, for example, InP with a typical thickness in the range of about 0.4-3 microns. The input waveguide 2, MMI portion 4, and output waveguides 6, 8 may be etched into the cladding layer. The MMI portion 4 may have a length L4 of about 93 microns, as measured along the longitudinal axis A4. The MMI portion 4 may also have a width W4 of about 8.5 microns. The input waveguide 2 and output waveguides 6, 8 may have a width ("WW") of about 2.5 microns. Alternatively, the MMI device 1 may also have a structure in which the waveguide is etched only partially through the top cladding or it could also be etched partially or entirely through the waveguide layer or into the substrate. This type of device could also be made from semiconductor materials other than InP, such as GaAs, Si, etc. Other non-semiconductor materials may be used such as, for example, polymers or silicon based waveguides. In one embodiment, the MMI device 1 is an epitaxial semiconductor structure in which the input and output waveguides 2, 6, 8 and the MMI portion 4 are grown on a substrate of crystalline semiconductor material, such as an indium phosphide (InP) substrate 12. It may be appreciated that other embodiments may use different materials and/or dimensions. The embodiments are not limited in this context.

Thus arranged, an optical signal as represented by arrow 14 may be input to a first end 2e of the input waveguide 2. The signal is transmitted through the input waveguide 2 to the MMI portion 4, and due to the tilted relationship between the input waveguide 2 and the MMI portion 4, the optical signal is introduced into the MMI splitter portion at an angle alpha ($\alpha$) with respect to the longitudinal axis A4 of MMI portion 4. The optical signal is split within the MMI portion 4 according to a splitting ratio as described below, and is introduced to the first and second output waveguides 6, 8. First and second split optical signals 16, 18 are output through the first and second output waveguides 6, 8.

As previously noted, due to the tilted arrangement of the input waveguide, the split optical signal introduced to the first output waveguide 6 will have a power that is different from a power of the split optical signal introduced to the second output waveguide 8. As will be appreciated, a desired splitting ratio (e.g., power of signal to waveguide 6 divided by power of signal to waveguide 8) can be achieved by selecting a particular angle alpha ($\alpha$). For example, a larger angle alpha ($\alpha$) may produce a split optical signal for the first output waveguide 6 with a decrease in power relative to a split optical signal for the second output waveguide 8. Conversely, a smaller angle alpha ($\alpha$) may produce a split optical signal for the first output waveguide 6 with an increase in power relative to a split optical signal for the second output waveguide 8. In this manner, the MMI device 1 provides a high level of granularity in achieving a desired splitting ratio based on careful selection of an angle beta ($\beta$) for the input waveguide 2 producing a corresponding splitting ratio.

In an alternative embodiment, output waveguides 6 and 8 may also be bent or angled so that the MMI device 1 may be connected to another MMI device having the same or different splitting ratio.

Figure 2:
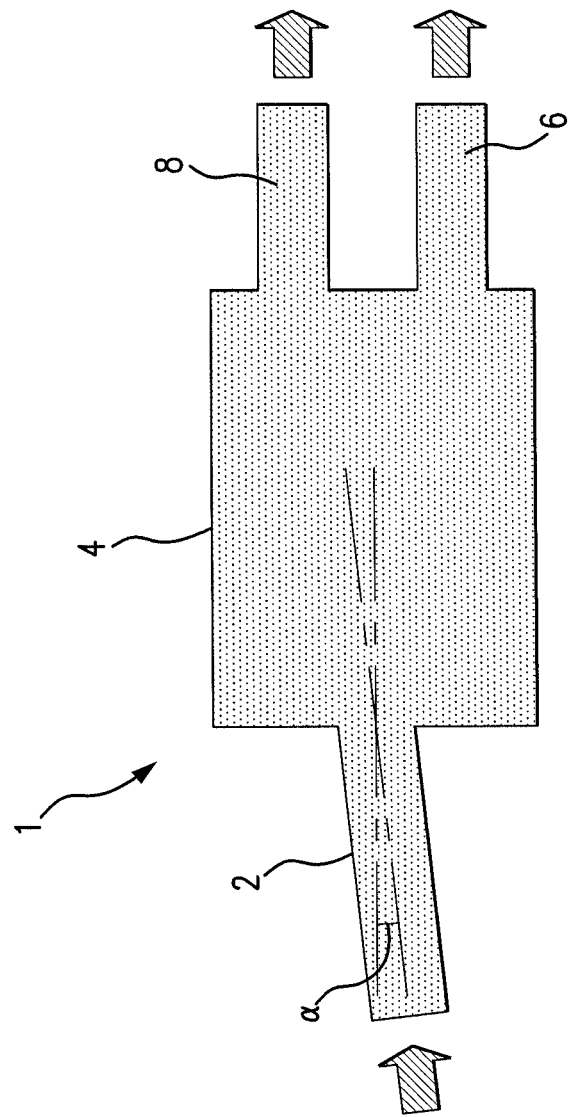
FIG. 2 is a functional top view of the MMI coupler of FIG. 1.

FIG. 2 is a top view of the MMI splitter 1 to more clearly illustrate the input waveguide 2 tilted or angled with respect to the propagation axis of the MMI portion 4. It is worthy to note that FIG. 2 omits the first portion 2a of the input waveguide 2 for purposes of clarity. In particular, the input waveguide is coupled to an input of MMI portion 4 and first and second output waveguides 6, 8 are coupled to an output of MMI portion 4. An optical signal is supplied to input waveguide 2 and is introduced to MMI splitter portion 4 at angle alpha ($\alpha$) output via output waveguides 6 and 8. As will be described below with respect to FIGS. 3-6, various splitting ratios and transmission characteristics may be achieved by varying angle alpha ($\alpha$).

FIGS. 3A-3D are optical field plots for various values of tilt angle alpha ($\alpha$) and associated splitting ratios. FIG. 3A shows a plot where angle alpha ($\alpha$) is 0-degrees and the input waveguide is essentially parallel to longitudinal axis A4 of MMI splitter portion 4. Thus, in this example the splitting ratio is about 1. FIG. 3B shows a plot in which angle alpha ($\alpha$) is 1-degree, which results in a splitting ratio of about 1.27. This translates into more light being coupled to output waveguide 8 rather than output waveguide 6. In other words, there is less transmission loss to output waveguide 8 as compared to output waveguide 6 for angle alpha ($\alpha$) at 1-degree. Similarly, FIG. 3C shows a plot in which angle alpha ($\alpha$) is 2-degrees, providing a splitting ratio of about 1.56, and even more light (e.g., less loss) is coupled to output waveguide 8 as compared to waveguide 6 shown in the plot of FIG. 3B. Furthermore, FIG. 3D shows a plot in which angle alpha ($\alpha$) is 3-degrees, providing a splitting ratio of about 1.85. As can be seen, as the angle alpha ($\alpha$) increases, the difference in optical power between the optical signals introduced into the first and second output waveguides 6, 8 varies.

Figure 4:
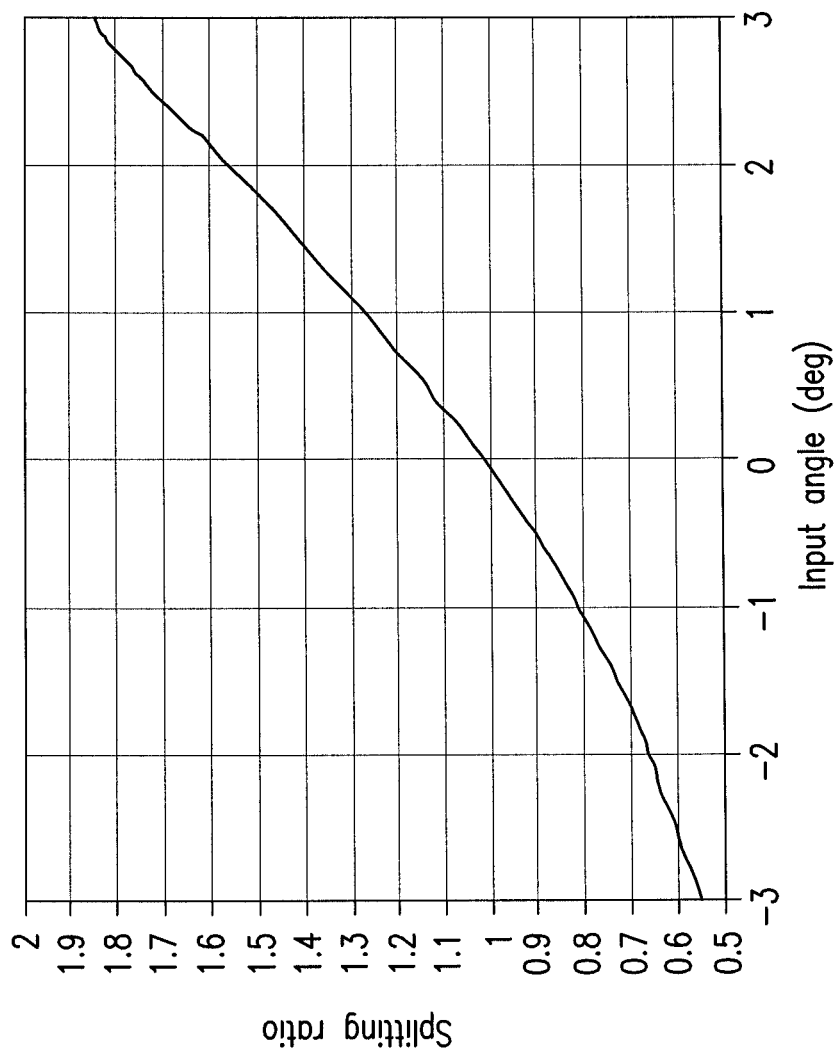
FIG. 4 is a graph illustrating splitting ratio versus input angle (in degrees) of the input waveguide.

FIG. 4 is a plot of the splitting ratio as a function of angle alpha ($\alpha$) (in degrees) of input waveguide portion 2b with respect to longitudinal axis A4 of MMI splitter portion 4. As can be seen, the splitting ratio ranges from about 0.55 at an angle alpha ($\alpha$) of −3 degrees to about 1.85 at an angle alpha ($\alpha$) of +3 degrees. As expected from symmetry considerations, the splitting ratio is "1" when angle alpha ($\alpha$) is "0." This plot illustrates that as the input angle alpha $\alpha$ increases, a splitting ratio between output waveguides 6 and 8 increases as well.

Figure 5:
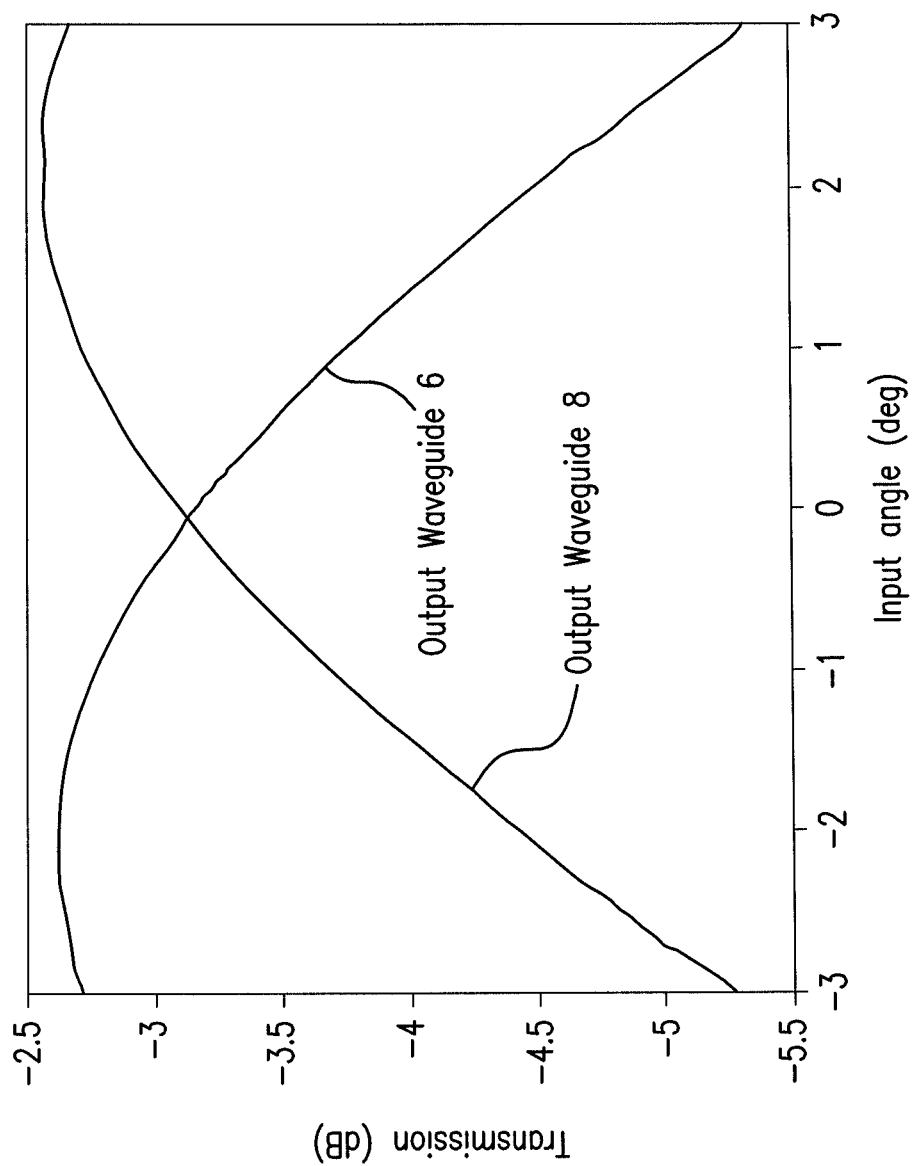
FIG. 5 is a graph illustrating transmission (in dB) versus input angle (in degrees) of the input waveguide.

FIG. 5 is a plot of transmission loss (dB) of the optical signals applied to each output waveguide 6, 8, as a function of angle alpha ($\alpha$). As can be seen, optical transmission loss is at a minimum when the tilt angle orients the input optical signal more directly toward a particular output waveguide. Thus, for an angle alpha ($\alpha$) of about −2 degrees, transmission loss to output waveguide 6 is near a minimum (e.g. transmission loss of about −2.75 dB), while transmission loss to output waveguide 8 is higher (e.g. at about −4.5 dB). Conversely, for angle alpha ($\alpha$) of about +2 degrees, transmission loss to output waveguide 8 is near a minimum (e.g., at about −2.75 dB), and transmission loss to output waveguide 6 is near a maximum (e.g., −4.5 dB).

Figure 6:
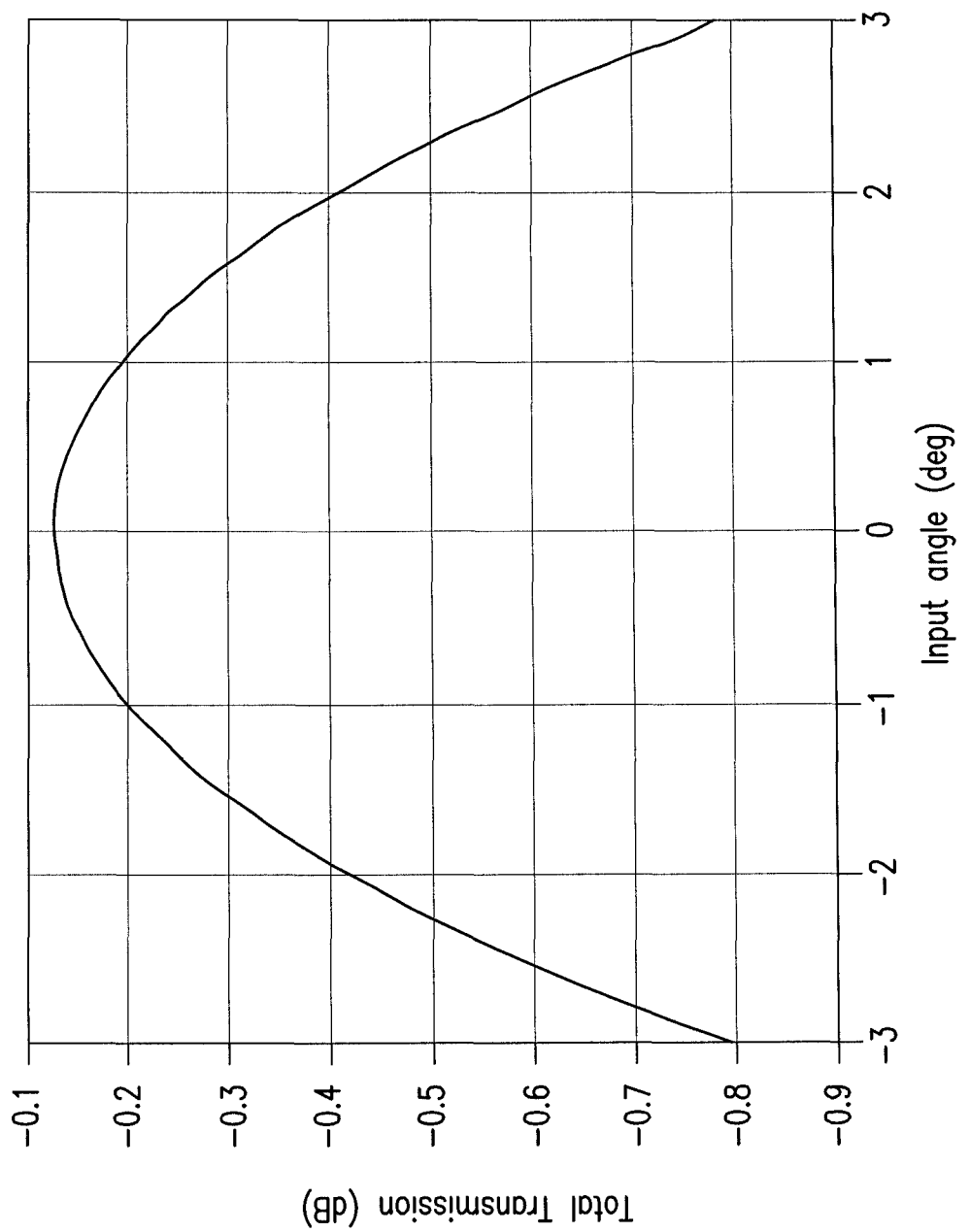
FIG. 6 is a graph illustrating total transmission (in dB) versus input angle (in degrees) of the input waveguide.

FIG. 6 is a plot of total transmission power loss (dB) as a function of angle alpha ($\alpha$). As can be seen, total transmitted power loss through the output waveguides 6, 8 is at a minimum when the angle alpha ($\alpha$) is 0, and falls off as the angle alpha ($\alpha$) magnitude increases or decreases. In other words, although the total transmission loss to both output waveguides 6, 8 increases from a minimum transmission loss at angle alpha ($\alpha$)=0, the amount of light output to one of the output waveguides may be greater than light supplied to the other output waveguide based on an increase or decrease of angle alpha ($\alpha$). In this manner, the additional loss introduced by the angle alpha ($\alpha$) is relatively small, while the splitting ratios considerably different from 1 can be achieved.

The MMI device 1 may be manufactured using typical semiconductor fabrication processes. For example, the cladding and waveguide layers may be formed by epitaxial growth onto an InP substrate using Metal Organic Chemical Vapor Deposition (MOCVD). The waveguide patterns may be defined with photolithography steps and etched using dry and/or wet etching. A dielectric layer such as, for example, SiN, SiO2, etc., is deposited over the entire structure for passivation. Alternative waveguide configurations such as buried waveguides would necessitate different fabrication processes and materials as known in the art.

Figure 7:
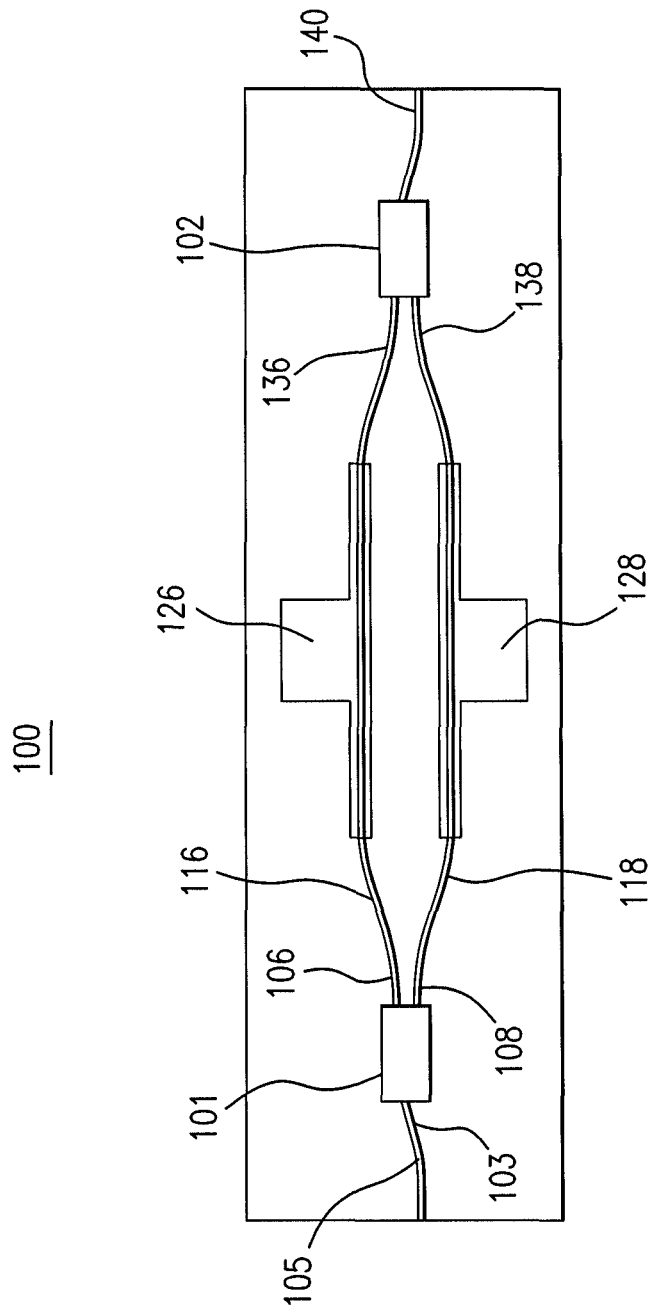
FIG. 7 is a block diagram of an exemplary Mach-Zehnder modulator employing MMI devices in accordance with the disclosure.

FIG. 7 is a block diagram of an exemplary Mach-Zehnder modulator (MZM) 100 employing an MMI device 101 used as a beam splitter and an MMI device 102 used as a beam combiner in accordance with the present disclosure. The MMI device 101 receives an optical signal via optical waveguiding medium 105, splits the received signal as described above with reference to the MMI device of FIG. 1 and supplies it to first and second output waveguides 106 and 108. The input to MMI device 101 may include an portion 103 of the optical waveguiding medium 105 that interfaces with the facet of the MMI device 101 at an acute angle. The MZM 100 includes a pair of optical interferometer arms 116, 118 employing a waveguiding material (InP) whose refractive index changes according to an applied electric field. A pair of electrodes 126, 128 is configured to apply such an electric field to respective interferometer arms to phase modulate the optical signals received from first and second output waveguides 106 and 108. Alternatively, only one of the interferometer arms may have an associated electrode in order to phase modulate the optical signal received from MMI 101.

As mentioned above, MMI 102 is employed as an optical combiner and recombines the optical signals received from interferometer arms 116, 118 via input waveguides 136, 138. When the optical signal is recombined, the light from the respective interferometer arms either constructively or destructively interferes depending upon the electric field applied to electrodes 126, 128, thereby creating an amplitude modulated output optical signal supplied to output 140. It is beneficial to have an unequal amount of light passing through the interferometer arms 116, 118 of MZM 100 in order to ensure a large ratio between power levels in the on and off state (i.e. constructive and destructive interference) and to obtain a desired frequency chirp. Generally, frequency chirp is a change in optical wavelength when a laser is modulated with a MZM at high bit rates. In this manner, the use of the MMI device 101 with an appropriate splitting ratio may be employed to supply the optical signals to the interferometer arms 116, 118 at the desired power levels in order to achieve the desired output of the MZM 100.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A multimode interference coupler, comprising:
a first waveguide defined by a first portion having a first propagation axis;
a multimode interference (MMI) portion positioned at an acute angle to said first propagation axis and having a first end optically coupled to the first waveguide, the MMI portion functioning to split a first optical signal into second and third optical signals each having a different power level according to a power ratio functionally associated with a magnitude of the acute angle; and
second and third waveguides optically coupled to a second end of the MMI portion, the second and third waveguides arranged to receive the second and third optical signals,
wherein the first waveguide further includes a second portion having a second propagation axis with an input facing away from the first end of the MMI portion, wherein the second propagation axis and propagation axes of the second and third waveguides of the MMI portion are substantially parallel.

2. The multimode interference coupler of claim 1, wherein the first, second, and third waveguides and the MMI portion are each grown on a substrate.

3. The multimode interference coupler of claim 2, further comprising a guiding layer positioned between the substrate and the first, second, and third waveguides and the MMI portion, the guiding layer having a smaller thickness than the first, second, and third waveguides and the MMI portion.

4. The multimode interference coupler of claim 1, wherein a length of the multimode interference coupler is about 90 microns.

5. The multimode interference coupler of claim 4, wherein a width of the MMI portion is about 8.5 microns.

6. The multimode interference coupler of claim 1, wherein the first propagation axis and the second propagation axis are not parallel.

7. The multimode interference coupler of claim 1, wherein the MMI portion defines a MMI propagation axis that is substantially parallel to at least one of the propagation axes of the second and third waveguides.

8. A Mach-Zehnder modulator comprising:
a first multimode interference (MMI) device having a first end optically coupled to an input waveguide, wherein the input waveguide comprises a first portion defining a first input propagation axis and a second portion defining a second input propagation axis at a first acute angle to the first input propagation axis, the first MMI device configured to receive a first optical signal and split the first optical signal into a second and third optical signals each having a respective power level and supplying said second optical signal to a first output waveguide and supplying said third optical signal to a second output waveguide, said MMI device having a MMI propagation axis at a second acute angle to the first input propagation axis of said input waveguide;
a first modulator arm coupled to the first output waveguide to receive the second optical signal;
a second modulator arm coupled to the second output waveguide to receive the third optical signal;
first and second electrodes coupled to the corresponding first and second modulator arms, each of said electrodes configured to change a refractive index in said modulator arms in response to an applied electric field; and
a second MMI device having a first input coupled to said first modulator arm and a second input coupled to said second modulator arm, said second MMI device configured to combine the second and third optical signals destructively or constructively based on a refractive index change in at least one of the modulator arms and output a modulated optical signal to an output waveguide of the second MMI device.

9. The Mach-Zehnder modulator of claim 8, wherein the modulator has a length of about 2 mm.

10. The Mach-Zehnder modulator of claim 9, wherein the first MMI device has a length of about 90 microns.

11. The Mach-Zehnder modulator of claim 8, wherein the first MMI device is grown on a first substrate and the second MMI device is grown on a second substrate.

12. The Mach-Zehnder modulator of claim 8, wherein the first output waveguide defines a first output propagation axis and the second output waveguide defines a second output propagation axis, wherein at least one of the first output propagation axis and the second output propagation axis is substantially parallel to the MMI propagation axis.

13. The Mach-Zehnder modulator of claim 8, wherein the first output waveguide defines a first output propagation axis and the second output waveguide defines a second output propagation axis, wherein at least one of the first output propagation axis and the second output propagation axis is substantially parallel to the second input propagation axis.

14. A method of splitting an input beam into two separate output beams comprising:
receiving an input optical signal along a first input propagation axis of an input waveguide;
sending the input optical signal through the input waveguide along a second input propagation axis, the first and second input propagation axes forming a first angle;
sending the input optical signal along the second input propagation axis to an optical splitter defining an optical splitter axis; and
splitting the input optical signal into at least a first output optical signal and a second output optical signal, with each of said output optical signals having a different power level in accordance with a power ratio defined by a second angle between the second input propagation axis and the optical splitter axis.

15. The method of claim 14, wherein the first output optical signal is sent along a first output propagation axis and the second output optical signal is sent along a second output propagation axis, wherein at least one of the first output propagation axis and the second output propagation axis is substantially parallel to the optical splitter axis.

16. The method of claim 14, wherein the first output optical signal is sent along a first output propagation axis and the second output optical signal is sent along a second output propagation axis, wherein at least one of the first output propagation axis and the second output propagation axis is substantially parallel to the second input propagation axis.

17. A method of modulating an optical beam comprising:
receiving a first optical signal at a first multimode interference (MMI) device;
moving the first optical signal within the first MMI device from a first propagation axis to a second propagation axis, the first propagation axis positioned at an acute angle relative to the second propagation axis;
splitting the first optical signal in the first MMI device into second and third optical signals with the second optical signal having a different power level than the third optical signal based on the acute angle;
moving the second optical signal from the first MMI device to a first output waveguide along a first output propagation axis and moving the third optical signal from the first MMI device to a second output waveguide along a second output propagation axis, wherein at least one of the first output propagation axis and the second output propagation axis is parallel to the second propagation axis;
applying an electrical field to interferometer arms along the first and second output waveguides and modulating a phase of at least one of the second and third optical signals;
moving the modulated second and third optical signals into a second MMI device and combining the signals destructively or constructively based on the electric field into a modulated fourth optical signal; and
outputting the modulated fourth optical signal from the second MMI device.

18. The method of claim 17, wherein, prior to receiving the first optical signal at the first MMI device, moving the first optical signal from a third propagation axis to the first propagation axis, wherein the third propagation axis is positioned at a second acute angle relative to the first propagation axis.

19. The method of claim 18, wherein at least one of the first output propagation axis and the second output propagation axis is substantially parallel to the third propagation axis.

* * * * *